United States Patent [19]

Schenck et al.

[11] 4,431,620

[45] Feb. 14, 1984

[54] PRODUCTION OF SODIUM TRIPOLYPHOSPHATE

[75] Inventors: Raban v. Schenck, Hürth, Fed. Rep. of Germany; Cent M. Eegdeman, Middelburg, Netherlands

[73] Assignee: Hoechst Aktiengesellschaft, Fed. Rep. of Germany

[21] Appl. No.: 371,601

[22] Filed: Apr. 26, 1982

Related U.S. Application Data

[63] Continuation of Ser. No. 964,829, Nov. 30, 1978, abandoned.

[30] Foreign Application Priority Data

Dec. 5, 1977 [DE] Fed. Rep. of Germany ....... 2754020

[51] Int. Cl.$^3$ .............................................. C01B 25/30
[52] U.S. Cl. ................................................... 423/315
[58] Field of Search ......................................... 423/315

[56] References Cited

U.S. PATENT DOCUMENTS

| 2,776,187 | 1/1957 | Pfrengle | 423/315 |
| 3,378,341 | 4/1968 | Hartlapp et al. | 423/315 |
| 3,391,991 | 7/1968 | Herink et al. | 423/315 |

FOREIGN PATENT DOCUMENTS 1133045  11/1968  United Kingdom ................ 423/315

Primary Examiner—Gary P. Straub
Assistant Examiner—Wayne A. Langel
Attorney, Agent, or Firm—Connolly and Hutz

[57] ABSTRACT

The invention relates to a process for making sodium tripolyphosphate from wet-processed phosphoric acids which contain organic impurities, are neutralized and concentrated to give an orthophosphate solution or suspension which is sprayed in a spray tower in contact with one or more oxidants. More particularly, sodium tripolyphosphate, which is suitable for use in detergent slurries and causes the temperature determined after 1 and 5 minutes, respectively, in the hydration test (ROH) to be increased by at least 7° C., is made; to this end, the wet-processed phosphoric acids are first admixed with the oxidants and then concentrated.

6 Claims, No Drawings

PRODUCTION OF SODIUM TRIPOLYPHOSPHATE

CROSS REFERENCE TO RELATED APPLICATION

This application is a continuation of application Ser. No. 964,829 filed Nov. 30, 1978 now abandoned.

This invention relates to a process for making sodium tripolyphosphate from wet-processed phosphoric acids, wherein the acids which contain organic contaminants are neutralized to the necessary molar ratio of Na:P and concentrated from a $P_2O_5$-content of initially less than 20 weight% to 27 to 32 weight%, preferably 30 to 31 weight%, and the resulting orthophosphate solutions or suspensions with the organic contaminants therein are subjected, in a fuel gas-heated spray tower, to a one step spray-drying operation in contact with one or more oxidants, at temperatures within the range 300° to 500° C.

It is known that crude phosphates can be treated with sulfuric acid to give so-called wet-processed phosphoric acids which can indeed be freed by various methods from the contaminants therein, except for a certain residual content of up to 3 weight%, based on $P_2O_5$, of oxidizable organic contaminants. In all those cases in which use is made of these wet-processed phosphoric acids for the production of alkali metal polyphosphates, the organic contiminants are liable to undergo decomposition and form decomposition products which appear in, and adversely affect the degree of whiteness of, the polyphosphates. Indeed, these polyphosphates generally have a degree of whiteness significantly poorer than that of salts which are made from electrothermally processed phosphoric acid.

It has already been described that the starting materials used for making phosphates which are to undergo thermal condensation to give pyrophosphates should be used in admixture with a proportion of nitric acid necessary to remove the organic contaminants therefrom (cf. German Pat. No. 379 293).

It has also been described (cf. German Pat. No. 965 126) that alkali metal tripolyphosphates should be prepared from a phosphate feed mixture containing at least 1 weigth% of one or more nitrates as agents catalyzing the condensation.

A further process for making tripolyphosphates of low apparent density has been described in German Pat. No. 1 567 632, wherein an orthophosphate solution or suspension containing organic contaminants is spray-dried and the organic contaminants therein, which act as reducing agents, are oxidized simultaneously. To this end, the process just described provides for the orthophosphate solution or suspension to be contacted, prior to being sprayed, with an oxidizing solution for a period of less than 1 second.

As disclosed in German Pat. No. 965 126, these known processes yield sodium tripolyphosphate of the so-called low temperature modification. This modification has long been held in the art to be the only modification which critically determines the slow hydration of sodium tripolyphosphate in contact with water.

Sodium tripolyphosphate is most widely used commercially as an ingredient of detergent compositions. In view of this, it is highly desirable for it to combine in itself a good hydration behaviour with the necessary degree of whiteness and apparent density. Modern detergent compositions are normally produced by spray-drying an aqueous slurry containing organic and inorganic detergent components, among which sodium tripolyphosphate.

Detergent compositions of poor flow properties and unsatisfactory storage life are, however, obtained in all those cases in which the builder, namely tripolyphosphate, undergoes incomplete hydration in the slurry. As regards the hydration of sodium tripolyphosphate, it is not desirable for it to occur too reluctantly as this has adverse effects on optimum utilization of the capacity of the production facilities, or too rapidly as this has adverse effects on the slurry which becomes unduly viscous. In other words, a factor which is critical for the production of reliable detergent compositions is the controlled hydration of sodium tripolyphosphate.

The hydration of sodium tripolyphosphate can be tested by various methods, of which the hydration test (ROH) initially disclosed by C-Y. SHEN and J. S. METCALF, Ind. & Eng. Chem. Prod. Res., Dec. 4 (1965), page 107 is most widely known in the art. In this test, 150 g of sodium tripolyphosphate is added to an 80° C. solution of 50 g of sodium sulfate in 200 g of distilled water, and the temperature is registered as a function of time. Sodium tripolyphosphate which has appropriate hydration properties effects, in this test, a temperature increase from 81° to 83° C. after 1 minute, up to 90° to 92° C. after 5 minutes, i.e. a temperature difference of 7° to 11° C.

In clear contrast with what has long been held in the art, we have found that it is not only the respective content of phase-I or phase-II material which critically determines the hydration behaviour of sodium tripolyphosphate made by a one step spray-drying process. The hydration behaviour also depends on the particle size of the sodium tripolyphosphate as indicated in the following Table for various sieve fractions of two specimens.

TABLE

| Sieve fraction | Specimen 1 | | | Specimen 2 | | |
|---|---|---|---|---|---|---|
| | ROH-value after 1 minute | ROH-value after 5 minutes | Phase-I wt % | ROH-value after 1 minute | ROH-value after 5 minutes | Phase-I wt % |
| >0.8 mm | 82.6 | 93.3 | 10 | 85.2 | 88.9 | 40 |
| 0.8–0.4 mm | 83.4 | 93.9 | 14 | 86.5 | 91.4 | 36 |
| 0.4–0.2 mm | 84.0 | 94.8 | 11 | 86.5 | 91.6 | 33 |
| 0.2–0.1 mm | 85.9 | 94.6 | 12 | 86.7 | 92.6 | 30 |
| 0.1–0.05 | 88.3 | 95.6 | 10 | 87.4 | 93.6 | 25 |
| <0.05 | 91.7 | 96.9 | 13 | 89.7 | 95.0 | 20 |
| Starting material | 85.2 | 92.4 | 11 | 86.9 | 92.5 | 29 |

As can be seen from the above Table, the hydration rate (ROH-value) increases with a decreasing particle size of the above sieve fractions, irrespective of the decreasing proportion of phase-I material (high temperature modification).

The rate of hydration is indeed more seriously influenced by the particle size or surface area than by the content of phase-I material. This is demonstrated inter alia by the following fact: A coarse sieve fraction (particle size >0.8 mm; 40 weight% phase-I; ROH-value after 1 minute=85.2; ROH-value after 5 minutes=88.9) was ground to greater fineness (0.2 to 0.1 mm). The finer product with the same content of phase-I material therein was found to show the same hydration behaviour (ROH-value after 1 minute=86.7; ROH-value after 5 minutes=92.6) as a sieve fraction of identical particle size but of lower (30 weight%) phase-I content.

Sodium orthophosphate solutions or suspensions having up to 3 weight%, based on $P_2O_5$, of organic contaminants therein, which are admixed, prior to being sprayed, with up to 5 weight%, based on $P_2O_5$, of an oxidant, such as $NaNO_3$ or $NaClO_3$, for example, give sprayed salts which undergo unsatisfactory hydration and contain increased proportions of sodium pyrophosphate.

This is a phenomenon which has more particularly been encountered in all those cases in which CO as the fuel gas in the spray tower was replaced by natural gas.

It is therefore an object of this invention to provide a process, wherein sodium tripolyphosphate which has the hydration properties necessary for making detergent slurries, i.e. the properties which cause the temperature determined after 1 and 5 minutes, respectively, in the hydration test (ROH) to be increased by at least 7 centigrade degrees, is made from sodium orthophosphate solutions or suspensions originating from neutralized wet-processed phosphoric acids which contain up to about 3 weight%, based on $P_2O_5$, of organic contaminants and have been concentrated from a $P_2O_5$-content of initially less than 20 weight% to 27 to 32 weight%.

To obtain sodium tripolyphosphate having the properties specified above, the present invention provides for the wet-processed phosphoric acids to be admixed with an oxidant removing the organic contaminants and for the resulting mixture to be concentrated.

Further preferred features of the present invention provide:
(a) for the oxidant to be used in proportions of 0.5 to 2 weight%, preferably 1 weight%, based on $P_2O_5$;
(b) for the wet-processed phosphoric acids to contain up to 3 weight%, based on $P_2O_5$, of organic contaminants;
(c) for the oxidants to comprise nitrates, chlorates and/or peroxides in salt form or in the form of a solution; and
(d) for natural gas to be used as the fuel gas in the spray tower substantially in the absence of the significant increase of the sodium pyrophosphate content in the final product which would have been expected.

EXAMPLE 1

(Comparative Example)

Thermally processed phosphoric acid free from organic contaminants was neutralized with sodium hydroxide solution so as to establish a $Na_2O:P_2O_5$-molar ratio of 5:3 and obtain a salt solution which contained about 30% of $P_2O_5$. The salt solution which had a temperature of about 90° C. was sprayed in a spray tower with the use of CO as the fuel gas. The off-gas temperature was about 380° C. The sodium tripolyphosphate so made was free from contaminants. It was ground and subjected to the hydration test in which it was found to increase the temperature from 81° to 82° C. after 1 minute up to 91° to 92° C. after 5 minutes. 98% of the salt was sodium tripolyphosphate. Its degree of whiteness was 96%, compared with that of analytically pure MgO.

EXAMPLE 2

(Comparative Example)

Example 1 was repeated but the salt solution was sprayed with the use of natural gas as the fuel gas. The off-gas temperature was again 380° C. The salt so made could not be found to differ from that made in Example 1.

EXAMPLE 3

(Comparative Example)

Wet-processed phosphoric acid (17% $P_2O_5$) which contained 0.1 weight%, based on $P_2O_5$, of organic contaminants was concentrated and neutralized with sodium hydroxide solution ($Na_2O:P_2O_5$-molar ratio=5:3; about 30% $P_2O_5$). Next, it was admixed with 1 weight%, based on $P_2O_5$, of $NaNO_3$ and the solution which had a temperature of about 90° C. was sprayed in known manner with the use of CO as the fuel gas. The off-gas temperature was again 380° C. The salt was ground and subjected to the hydration test in which it was found to increase the temperature from 81° to 82° C. after 1 minute up to only 87° to 88° C. after 5 minutes. The salt contained 96% of sodium tripolyphosphate and had a 89 to 90% degree of whiteness.

EXAMPLE 4

(Comparative Example)

Example 3 was repeated but the salt solution was sprayed with the use of natural gas as the fuel gas. The off-gas temperature was again about 380° C. The final salt was ground and subjected to the hydration test in which it was found to increase the temperature from 84° to 86° C. after 1 minute up to 88° to 89° C. after 5 minutes. The salt contained 93 to 94% of sodium tripolyphosphate and had only an about 90% degree of whiteness.

EXAMPLE 5

(Invention)

Wet-processed phosphoric acid (17% $P_2O_5$) which contained 0.2 weight%, based on $P_2O_5$, of organic contaminants was first admixed with 1 weight%, based on $P_2O_5$, of $NaNO_3$, then concentrated and neutralized. After it had been neutralized with sodium hydroxide solution ($Na_2O:P_2O_5$-molar ratio=5:3; about 30% $P_2O_5$), the salt solution which had a temperature of about 90° C. was sprayed in known manner with the use of CO as the fuel gas. The off-gas temperature was about 380° C. The salt so made was ground and subjected to the hydration test in which it was found to increase the temperature from 81° to 82° C. after 1 minute up to 90° to 92° C. after 5 minutes. 97% of the salt was sodium tripolyphosphate. Its degree of whiteness was 94%.

EXAMPLE 6

(Invention)

Example 5 was repeated but natural gas was used as the fuel gas. The wet-processed phosphoric acid of low $P_2O_5$-content was first admixed with the oxidant and then concentrated. The resulting salt was found to compare very favorably with that of Example 4. In the hydration test, it was found to increase the temperature from 82° to 83° C. after 1 minute up to 90° to 91° C. after 5 minutes. The salt so made contained 97% of sodium tripolyphosphate and had a 94% degree of whiteness.

EXAMPLE 7

(Invention)

Example 6 was repeated with the use of natural gas as the fuel gas. Prior to concentrating the wet-processed phosphoric acid, it was admixed with 0.5 weight%, based on $P_2O_5$, of hydrogen peroxide as the oxidant. The resulting salt was found to compare favorably even with that obtained in Example 6. In the filtration test, it was found to increase the temperature from 80° to 81° C. after 1 minute up to 90° to 92° C. after 5 minutes. The salt so made contained 97% of sodium tripolyphosphate and had a 94 to 95% degree of whiteness.

We claim:

1. In the process of making sodium tripolyphosphate in the presence of one or more oxidants, from wet-processed phosphoric acids containing organic impurities and having initially a $P_2O_5$ content of less than 20 weight%, by neutralizing the phosphoric acid to a molar ratio of Na:P of 5:3 and one step spray drying the resulting orthophosphate solutions or suspensions in a spray tower, the improvement which comprises:
   (a) adding the oxidant to the phosphoric acid,
   (b) thereafter concentrating the acid to a $P_2O_5$ content of 27 to 32 weight %,
   (c) neutralizing the concentrated acid and
   (d) subjecting the orthophosphate solution or suspension obtained to a one step spray drying process at temperatures within the range of 300° to 500° C. with the resultant formation of a sodium tripolyphosphate suitable for use in detergent slurries and yielding in the hydration test (ROH) a rise of temperature of at least 7° C. between temperatures determined after 1 and 5 minutes.

2. The process as claimed in claim 1, wherein the wet-processed phosphoric acids are admixed with 0.5 to 2 weight %, based on $P_2O_5$, of the oxidant.

3. The process as claimed in claim 2, wherein the wet-processed phosphoric acids are admixed with 1 weight %, based on $P_2O_5$, of the oxidant.

4. The process as claimed in claim 1, wherein the wet-processed phosphoric acids contain up to 3 weight %, based on $P_2O_5$, of organic impurities.

5. The process as claimed in claim 1, wherein the oxidant is selected from nitrates, chlorates or peroxides which are used in salt form or in the form of a solution.

6. The process as claimed in claim 1, wherein the fuel gas used in the spray tower is natural gas.

* * * * *